Dec. 27, 1966 H. BROCKMAN 3,293,940
ENGINE CRANKSHAFT
Filed Dec. 7, 1964
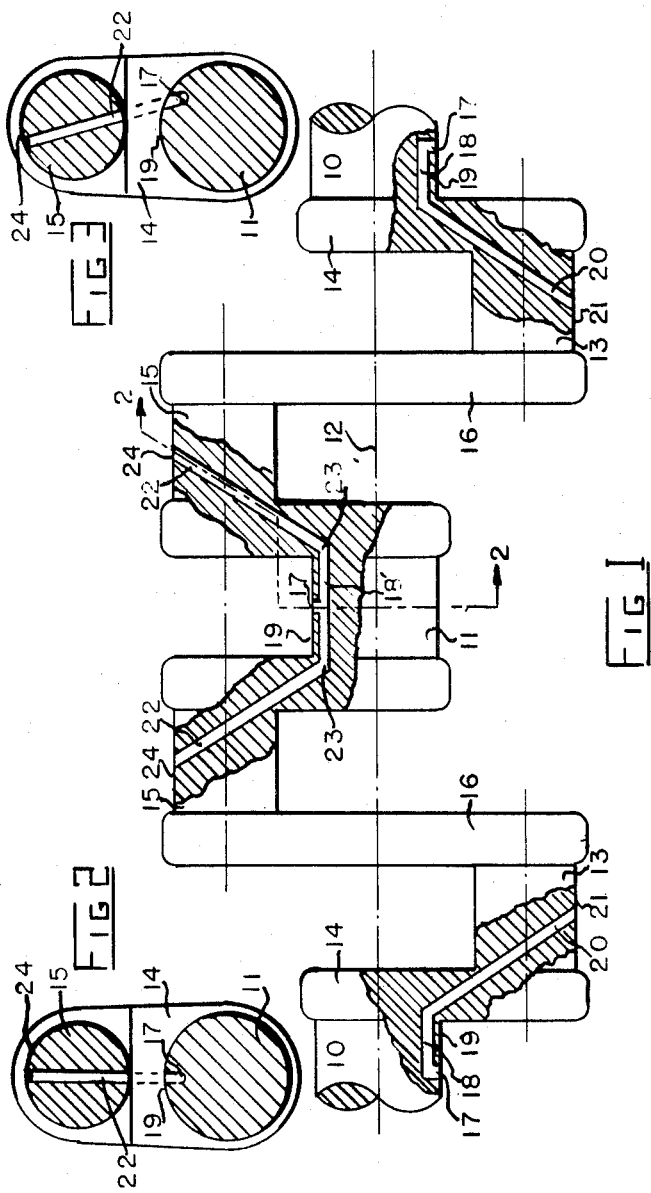
INVENTOR.
HENRY BROCKMAN

United States Patent Office 3,293,940
Patented Dec. 27, 1966

3,293,940
ENGINE CRANKSHAFT
Henry Brockman, Box 147, Humboldt,
Saskatchewan, Canada
Filed Dec. 7, 1964, Ser. No. 416,345
1 Claim. (Cl. 74—596)

This invention relates to new and useful improvements in crankshafts for multi-cylinder internal combustion engines in which the lubricating oil is force fed by means of oil passages drilled through the main and connecting rod bearing pins.

In conventional force feed oiling systems, the oil is fed to the main bearings by means of a pump having an average pressure of approximately 45 pounds per square inch. The pump picks up oil from the sump, transfers same to galleries and passageways within the cylinder block, and feeds the oil to the main bearing shells. Each main bearing pin of the crankshaft is apertured and this aperture passes over the aperture feeding the oil to the bearing so that at each revolution of the crankshaft, oil is forced under pressure into the main bearing pin.

Most multi-cylinder internal combustion engines manufactured and in use today employ a force feed or pressure oiling system which feeds the oil to the bearings as aforesaid, at a given pressure.

In the actual operation of such an engine, this pressurized oiling system is adequate at low engine speeds. However, as the engine r.p.m. is increased, the centrifugal force created by the increased speed of the revolving crankshaft likewise increases.

The oil is usually routed from the main bearing pins via diagonal drillings within the webs to the offset crank pin webs and these galleries usually cross the longitudinal axis of the crankshaft.

With such an increase in the centrifugal force, there is a resistance to the passage of the oil where is crosses the longitudinal axis. Such resistance is due to the manner in which the oil passage is constructed. As mentioned previously, it is conventional that the oil passageways enter the main bearing at one side of the axis of centrifugal force or the longitudinal axis, cross this axis and proceed to the connecting rod bearing pins.

If the crankshaft is stationary, oil entering the passageways may flow freely to the crank pins. When, however, the motor is running, centrifugal force is created by the rotation of the crankshaft and this centrifugal force assists the oil when same is moving out and away from the center of rotation.

Consequently, as the oil passes from the main bearing pin and approaches the centrifugal or longitudinal axis, the centrifugal force created by the rotation of the crankshaft restricts the movement of the oil towards the longitudinal axis thus restricting the movement of the oil to the connecting rod bearings or crank pins.

Once the oil passes the longitudinal axis, the effect is reversed, and the centrifugal force, in throwing the oil away from the longitudinal axis, assists the movement of the oil through the passageways to the connecting rod bearing pins.

As the result of this opposing force encountered by the oil approaching the longitudinal axis, the amount of oil that can be supplied to the bearings, at a given pressure, is decreased, which decrease in oil supply is inversely related to the increase in the r.p.m. of the crankshaft. Consequently, the higher the motor speed, the less oil is supplied to the crankpin bearings and at relatively high r.p.m., the oil pump is incapable of overcoming centrifugal force, resulting in oil starvation at the crank pin bearings and subsequent seizing of these bearings.

The principal object and essence of this invention is therefore to construct a crankshaft having oil passageways connecting the oil supply from the main bearing pins to the connecting or crank pins in such manner that the resistance due to centrifugal force is reduced to a minimum. In the present device this is accomplished by placing the entrance of the oil passageway of the main bearing pins on the same side of the longitudinal or centrifugal axis, as the side upon which the respective connecting rod bearing pin is located.

A further object of the invention is to provide a device of the character herewithin described which facilitates the feeding of the oil to the crankshaft bearings irrespective of the speed of rotation of the crankshaft.

A yet further object of the invention is to provide a device of the character herewithin described which is simple in construction, economical in manufacture, and otherwise well suited to the purpose for which it is designed.

With the foregoing objects in view, and such other objects and advantages as will become apparent to those skilled in the art to which this invention relates as this specification proceeds, my invention consists essentially in the arrangement and construction of parts all as hereinafter more particularly described, reference being had to the accompanying drawings in which:

FIGURE 1 is a side elevation of a four cylinder crankshaft sectioned in part to show the interior thereof.

FIGURE 2 is a sectional view substantially along the line 2—2 of FIGURE 1.

FIGURE 3 is a view similar to FIGURE 2 but showing an alternative embodiment of my invention.

In the drawings like characters of reference indicate corresponding parts in the different figures.

Proceeding therefore to describe my invention in detail, reference character 10 illustrates a pair of end main bearing pins and 11 illustrates and intermediate main bearing pin, all pins lying on the same longitudinal axis indicated by the reference character 12.

Connecting rod or crank bearing pins 13 are provided in an offset relationship, one for each cylinder of the engine, and these crank bearing pins are connected by means of radially extending webs 14, extending between the end main bearings pin 10 and the adjacent crank bearing pins 13.

In this particular construction of crankshaft, crank bearing pins 15 are connected to the intermediate main bearing pin 11 by similar webs 14 and the crank bearing pins 15 are connected to the crank bearing pins 13 by means of the elongated webs 16.

However, the design of crankshafts varies and in some engines, each crank bearing pin is supported between a pair of main bearing pins.

Situated intermediate the ends of the end main bearing pins 10 is an oil pickup aperture 17 communicating with a horizontal main bearing pin oil passageway 18 extending towards the web 14 and positioned relatively close to the surface 19 of the main bearing pin, a clearance of some ten thousandths of an inch being sufficient so that the location of this horizontal passageway 18 is as far as possible from the longitudinal axis 12.

The location of the entrance aperture 17 is on the same side of the main bearing pin 10 as the crank bearing pin 13 which it is designed to feed.

A diagonal oil passageway 20 extends from the inner end 21 of the horizontal oil passageway 18, to a position approximately midway along the length of the crank bearing pin 13 and communicating with the outer peripheral surface 21 of this main bearing pin on the outer side thereof when viewed in end elevation so that the entire oil passageway system comprising the entrance aperture 17, the horizontal passageway 18, and the diagonal passageway 21, are all upon the same side of the longitudinal axis 12 of the crankshaft.

When the construction is such that the intermediate main bearing 11 supports a pair of crank bearing pins 15 which are in longitudinal alignment, one with the other, the horizontal passageway specifically designated 18' extends the full length of the main bearing pin 11 and once again is spaced as close as possible to the surface 19 of this main bearing pin.

The entrance aperture 17 communicates with this horizontal oil passageway intermediate the ends thereof and oil is fed to both sides of this horizontal passageway.

Diagonally situated crank pin oil passageways 22 extend through the webs from the ends 23 of the horizontal oil passageway 18' and communicate with the outer peripheral surfaces 24 of the crank pins 15 as clearly illustrated.

Once again the entire oil passageways system feeding the two crank pins 15 is situated upon one side of the longitudinal axis 12 of the crankshaft.

In operation, the oil is pumped to the main bearings (not illustrated) and picked up upon each revolution of the crank shaft through the entrance apertures 17. This oil under pressure, enters the horizontal oil passageways 18 and 18' and is then forced along the diagonal passageways 20 and 22 to the outer peripheral surfaces 21 and 24 of the individual crank bearing pins and due to the situation of the oil passageways, resistance to the flow of the oil caused by centrifugal force is eliminated.

In fact the movement of the oil through the diagonal passageways is assisted by the centrifugal force generated by the rotation of the crankshaft.

Two aspects of the present construction of the oil passageways account for this reduction in centrifugal resistance, namely, the construction of the entire oil passageway system from each main bearing pin to the corresponding crank bearing pin so that they are upon the same side of the longitudinal axis of the crankshaft.

Secondly the increase to a maximum of the distance between the horizontal oil passageways 18' and the diagonal passageways 22 and 20 from the longitudinal axis 12 of the crankshaft thus taking advantage of the maximum centrifugal force generated by the rotation of the crankshaft. The distance between the horizontal oil passageways 18 and 18' should be at an absolute minimum and in the neighborhood of approximately ten thousandths of an inch.

As a result of this invention, the oil entering the crankshaft at the main bearing pins meets minimum resistance from centrifugal force in the flow thereof to the connecting rod bearing pins. This therefore ensures a continued and adequate supply of oil to the connecting rod bearing pins even at maximum revolutions per minute of the crankshaft thus preventing oil starvation at the connecting rod or crank pin bearings, the pistons, cylinder walls, wrist pins, cam shaft lifters and valves.

The added oil that is discharged during rotation of the crankshaft and from the connecting rod bearings thereof, assists in cooling the engine. The end result is more power per gallon of fuel and engine life prolonged many times.

FIGURE 3 shows an alternative locations of the diagonal oil passageway 22 in which said passageway inclines from one side to the other when viewed in end elevation. This location may be desirable under certain circumstances.

Since various modifications can be made in my invention as hereinabove described, and many apparently widely different embodiments of same made within the spirit and scope of the claim without departing from such spirit and scope, it is intended that all matter contained in the accompanying specification shall be interpreted as illustrative only and not in a limiting sense.

What I claim as my invention is:

In an engine crankshaft, the combination of a cylindrical main bearing pin, a radial web extending laterally to one side of said main bearing pin, and a crank bearing pin connected to said web, said main bearing pin being provided with an oil passage parallel to the main bearing pin axis and eccentrically offset from said axis to the same side of the main bearing pin to which said web projects, one end of said passage being angulated and having an oil entrance opening at said one side of the main bearing pin, the other end of said passage communicating with a straight passage extension extending diagonally through said web and through said crank bearing pin, said passage extension terminating in an oil outlet aperture at the same side of the crank bearing pin as said oil entrance opening of the main bearing pin, said oil passage in the main bearing pin being very closely spaced from the main bearing pin side surface by a passage wall thickness of approximately ten thousandths of an inch.

References Cited by the Examiner

UNITED STATES PATENTS

| 2,730,912 | 1/1956 | Marinelli | 74—597 |
| 3,069,926 | 12/1962 | Hoffman et al. | 74—605 |

FOREIGN PATENTS

| 972,911 | 9/1950 | France. |
| 950,215 | 2/1964 | Great Britain. |

FRED C. MATTERN, JR., *Primary Examiner.*

W. S. RATLIFF, *Assistant Examiner.*